(12) United States Patent
Kim et al.

(10) Patent No.: US 8,692,791 B2
(45) Date of Patent: Apr. 8, 2014

(54) TOUCH PANEL

(75) Inventors: Woon Chun Kim, Gyunggi-do (KR);
Won Ha Moon, Gyunggi-do (KR); Yong Soo Oh, Gyunggi-do (KR); Jong Young Lee, Gyunggi-do (KR)

(73) Assignee: Samsung Electro-Mechanics Co., Ltd., Gyunggi-Do (KR)

( * ) Notice: Subject to any disclaimer, the term of this patent is extended or adjusted under 35 U.S.C. 154(b) by 264 days.

(21) Appl. No.: 13/338,927

(22) Filed: Dec. 28, 2011

(65) Prior Publication Data
US 2012/0194453 A1  Aug. 2, 2012

(30) Foreign Application Priority Data
Feb. 1, 2011   (KR) .................. 10-2011-0010273

(51) Int. Cl.
*G06F 3/041*   (2006.01)
(52) U.S. Cl.
USPC .............. 345/173; 349/58; 349/139; 313/512
(58) Field of Classification Search
None
See application file for complete search history.

(56) References Cited

U.S. PATENT DOCUMENTS

| RE42,215 E | * | 3/2011 | Kobayashi et al. | 313/512 |
|---|---|---|---|---|
| 7,948,574 B2 | * | 5/2011 | Chen et al. | 349/58 |
| 2011/0304566 A1 | * | 12/2011 | Han | 345/173 |
| 2012/0146921 A1 | * | 6/2012 | Park | 345/173 |

* cited by examiner

*Primary Examiner* — Srilakshmi K Kumar
*Assistant Examiner* — Sardis Azongha
(74) *Attorney, Agent, or Firm* — Ladas & Parry, LLP

(57) ABSTRACT

Disclosed herein is a touch panel. A touch panel according to a first preferred embodiment of the present invention includes: a base member; a transparent electrode formed in an active area of the base member; an insulator formed in a bezel area of the base member, and convexly protruded from the base member; and an electrode wiring formed on an exposed surface of the insulator. In addition, a touch panel according to a second preferred embodiment of the present invention includes: a base member having a groove portion formed such that an exposed surface thereof has a concave curved surface; a transparent electrode formed in an active area; and an electrode wire connected to one end or both ends of the transparent electrode and formed on the exposed surface of the groove portion.

16 Claims, 5 Drawing Sheets

TOUCH PANEL

CROSS REFERENCE TO RELATED APPLICATION

This application claims the benefit of Korean Patent Application No. 10-2011-0010273, filed on Feb. 1, 2011, entitled "Touch Panel", which is hereby incorporated by reference in its entirety into this application.

BACKGROUND OF THE INVENTION

1. Technical Field

The present invention relates to a touch panel.

2. Description of the Related Art

With the development of computers using digital technology, devices assisting the computers have also been developed, and personal computers, portable transmitters and other personal information processors execute processing of text and graphics using a variety of input devices such as a keyboard, a mouse and so on.

While the rapid advancement of an information-oriented society has been widening the use of computers more and more, there have been occurring the problems of it being difficult to efficiently operate products using only the keyboard and mouse as being currently responsible for the input device function. Thus, the demand for a device that is simple, has minimal malfunction, and has the capability to easily input information is increasing.

Furthermore, current techniques for input devices exceed the level of fulfilling general functions and thus are progressing towards techniques related to high reliability, durability, innovation, designing and manufacturing. To achieve this purpose, a touch screen has been developed as an input device capable of inputting information such as text and graphics.

The touch screen is mounted on the display surface of an image display device such as an electronic organizer, a flat panel display including a liquid crystal display (LCD), a plasma display panel (PDP), an electroluminescence (El) device or the like, or a cathode ray tube (CRT), so that a user selects the information desired while viewing the image display device.

The touch screen can be classified into a resistive type, a capacitive type, an electromagnetic type, a surface acoustic wave (SAW) type, and an infrared type. These various types of touch screens are adapted to electronic products in consideration of signal amplification problems, resolution differences, the degree of difficulty of designing and manufacturing technology, optical properties, electrical properties, mechanical properties, environment-resistant properties, input properties, durability, and economic feasibility. Currently, the resistive touch panel and the capacitive type touch panel are prevalently used in a broad range of most fields.

The resistive type touch panel has a configuration in which upper/lower transparent electrode films are disposed such that they are spaced apart from each other by a spacer, and they are contactable with each other by user touch. When an upper touch panel in which an upper transparent electrode film is formed is pressed by an input unit, such as, a finger, a pen, or the like, upper/lower transparent electrode films are conducted and a controller senses a change in voltage due to a change in resistance value at the position and thus recognizes the touched coordinate. As the resistive type of touch panel, there are a digital resistive type of touch panel and an analog resistive type of touch panel.

In the capacitive type touch panel, an upper substrate in which a first electrode pattern is formed, and a lower substrate in which a second electrode pattern is formed, are spaced from each other, and an insulator is inserted therebetween to prevent the first electrode pattern and the second electrode pattern from being contacted with each other. In addition, the upper substrate and the lower substrate are provided with electrode wirings connected to the electrode patterns. The electrode wirings transfer the change in capacitance, which is generated between the first electrode pattern and the second electrode pattern when a touch screen is pressed by the input unit, to a controller.

Here, the touch panel may be divided into an active area and a bezel area surrounding the active area. When an image display device is coupled with a lower part of a touch panel, an image generated in the image display device passes through the active area, but not the bezel area. Transparent electrodes for recognizing a point touched by the user therethrough are formed in the active area, and electrode wires for applying electric power therethrough are formed in the bezel area.

In cases of the touch panel of the prior art, there was a technical limitation in that the space between electrode wirings can not be reduced to several tens of an or less because short circuits may occur between the electrode wirings. Therefore, when plural electrode wirings are formed, an area where the electrode wirings occupied was increased due to a predetermined space between the electrode wirings. As a result, the increase of an electrode wiring area means an increase of the bezel area, with the result that the active area is relatively decreased in a restricted size of the touch panel. Furthermore, the increase of the bezel area prevented the touch panel from being downsized.

SUMMARY OF THE INVENTION

The present invention has been made in an effort to provide a touch panel of which the size of a bezel area can be decreased, by forming electrode wirings not on a base member but on an insulator convexly protruded from the base member or a curved surface of a groove concavely excavated from the base member.

According to a first preferred embodiment of the present invention, there is provided a touch panel, including: a base member divided into an active area positioned at the center thereof, and a bezel area positioned at the edge thereof while surrounding the active area; a transparent electrode formed in the active area; an insulator formed in the bezel area, and convexly protruded from the base member such that an exposed surface thereof has a curved surface; and an electrode wiring formed on the exposed surface of the insulator and connected to one end or both ends of the transparent electrode.

The insulator may have a cross-section with a predetermined curvature.

The insulator may have a cross-section of semi-circle shape or semi-ellipse shape.

The transparent electrode may be patterned in a bar shape, a diamond shape, a circle shape, or a triangle shape.

The transparent electrode may be patterned and formed in plural number, and the number of electrode wirings may be plural so that the plural electrode wirings are connected to the plural transparent electrodes, respectively.

The insulator may have a width, which is smaller than the sum of widths of the plural electrode wirings and lengths of distances between the electrode wirings.

The insulator may be formed of any one of a phenol resin, an epoxy resin, and an imide resin.

The transparent electrode may be formed of a conductive polymer.

The conductive polymer may include poly-3,4-ethylenedioxythiophene polystyrenesulfonate (PEDOT/PSS), polyaniline, polyacetylene or polyphenylenevinylene.

According to a second preferred embodiment of the present invention, there is provided a touch panel, including: a base member divided into an active area positioned at the center thereof, and a bezel area positioned at the edge thereof while surrounding the active area, and including a groove portion being formed in the bezel area such that an exposed surface thereof has a concave curved surface; a transparent electrode formed in the active area; and an electrode wire connected to one end or both ends of the transparent electrode and formed on the exposed surface of the groove portion.

The groove portion may have a cross-section with a predetermined curvature.

The groove portion may have a cross-section of semi-circle shape or semi-ellipse shape.

The transparent electrode may be patterned and formed in plural number, and the number of electrode wirings may be plural so that the plural electrode wirings are connected to the plural transparent electrodes, respectively.

The groove portion may have a width, which is smaller than the sum of widths of the plural electrode wirings and lengths of distances between the electrode wirings.

The transparent electrode may be formed of a conductive polymer.

The conductive polymer may include poly-3,4-ethylenedioxythiophene polystyrenesulfonate (PEDOT/PSS), polyaniline, polyacetylene or polyphenylenevinylene.

DESCRIPTION OF THE PREFERRED EMBODIMENTS

Figure 1:
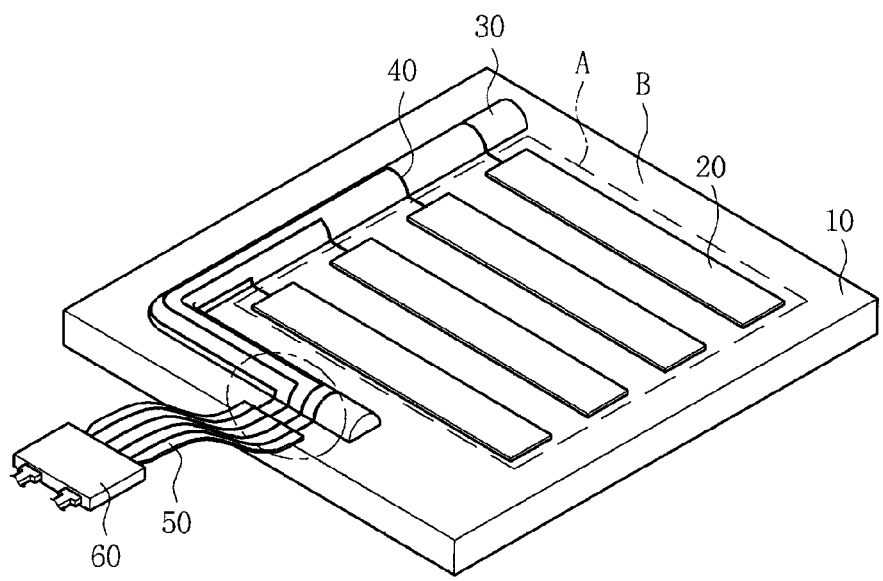
FIG. 1 is a perspective view of a touch panel according to a first preferred embodiment of the present invention.

Various objects, advantages and features of the invention will become apparent from the following description of embodiments with reference to the accompanying drawings.

The terms and words used in the present specification and claims should not be interpreted as being limited to typical meanings or dictionary definitions, but should be interpreted as having meanings and concepts relevant to the technical scope of the present invention based on the rule according to which an inventor can appropriately define the concept of the term to describe most appropriately the best method he or she knows for carrying out the invention.

The above and other objects, features and advantages of the present invention will be more clearly understood from the following detailed description taken in conjunction with the accompanying drawings. In the specification, in adding reference numerals to components throughout the drawings, it is to be noted that like reference numerals designate like components even though components are shown in different drawings. Further, in describing the present invention, a detailed description of related known functions or configurations will be omitted so as not to obscure the gist of the present invention.

Hereafter, preferred embodiments of the present invention will be described in detail with reference to the accompanying drawings.

As shown in FIG. 1, a touch panel according to a first preferred embodiment of the present invention includes a base member 10, transparent electrodes 20 formed in an active area A of the base member 10, an insulator 30 convexly protruded from the base member 10 and formed in a bezel area B, and electrode wirings 40 formed on an exposed surface of the insulator 30. Here, the active area A is referred to as an area in which a touched point is recognized. It is general to treat the bezel area B, which surrounds the active area A, as to be unrecognizable by a user. Hereinafter, the touch panel will be described in detail according to the components thereof.

The insulator 30 is convexly protruded on the base member 10 while it is formed in the bezel area B. Specifically, one end of the insulator 30 is extended such that one end thereof is positioned at one side surface of the transparent electrode 20 and the other end thereof is positioned at one side of the base member 10. Here, one side of the base member 10 is referred to as an area indicated by a dot-and-dash line in FIG. 1. The insulator 30 is convexly protruded, and thus the exposed surface thereof has a curved surface. As a result, the surface area of the insulator is increased by 57% or more, as compared when the exposed surface has a flat surface. Therefore, more electrode wirings 40 can be formed on the exposed surface of the insulator 30 of which the surface area is increased, based on the same width of the base member 10.

Figure 2A:
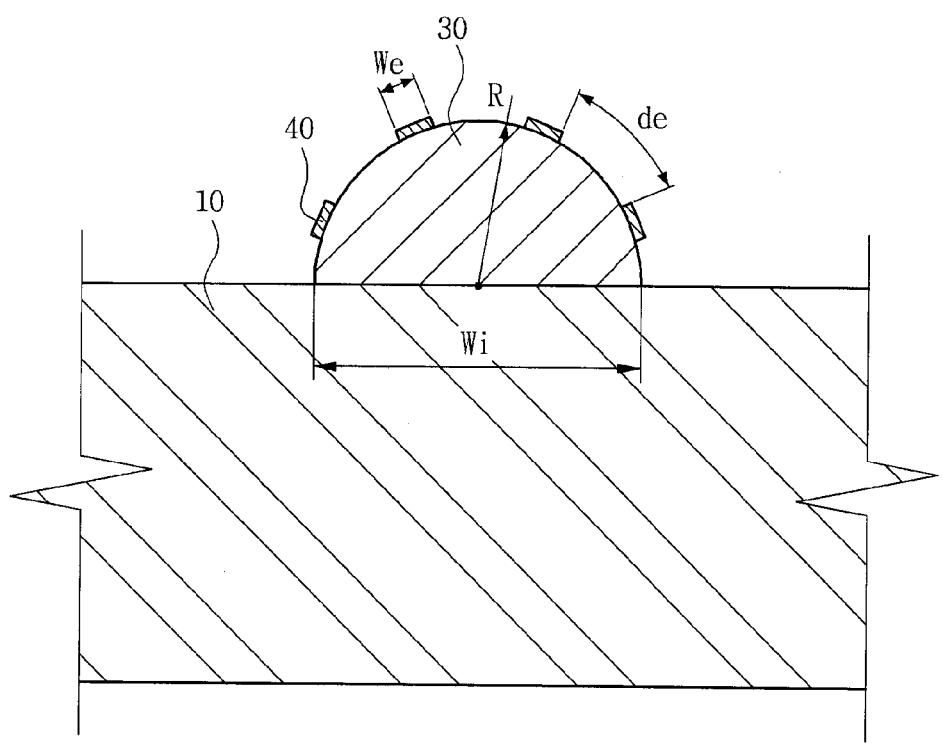
FIGS. 2A and 2B are cross-sectional views showing the insulator and the electrode wirings shown in FIG. 1.
Figure 2B:
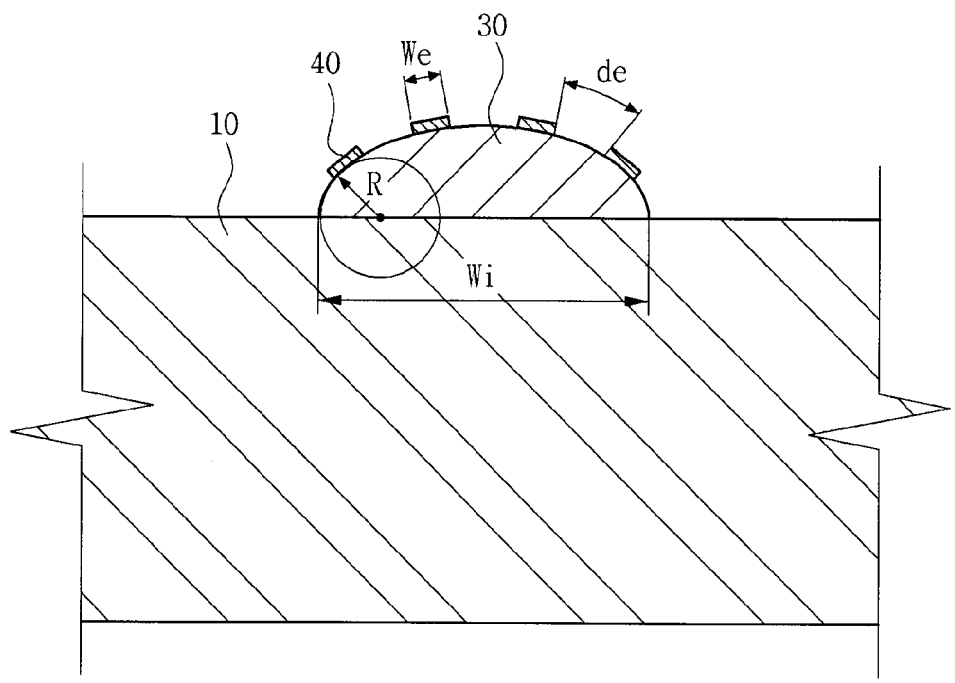

Here, as shown in FIGS. 2A and 2B, a cross-section of the insulator has a predetermined curvature. This curvature may be expressed by the reciprocal of a radius of a circle bordering any point of the cross-section of the insulator, that is, the reciprocal of a radius curvature (R) of the point. As such, the cross-section of the insulator 30 has the curvature, and thus, has a shape convexly protruded from the base member 10. The cross-section of the insulator 30 may have a semi-circle shape (FIG. 2A) or a semi-ellipse shape (FIG. 2B). In addition, when the cross-section of the insulator 30 has the semi-circle shape, the exposed surface of the insulator 30 has an area, which is about 1.7 times larger than an area of a flat surface, based on the same width of the base member 10. However, the cross-section of the insulator 30 is not limited thereto, and for example, may include any shape that can have a curvature.

In addition, a width (Wi) of the insulator 30 is smaller than the sum of widths (We) of the plural electrode wirings 40 and lengths of distances between electrode wirings (de). Therefore, the plural electrode wirings 40 are formed on the insulator 30 having a width narrower than a width occupied by forming the same number of electrode wirings 40 on the flat surface of the base member 10, and thus, the area of the bezel area B can be decreased.

Meanwhile, the insulator 30 may be made of an insulating material, that is, any one of a phenol resin, an epoxy resin, and an imide resin. The insulating material has an advantage in excellent processability and low price.

The electrode wirings 40 are formed on the exposed surface of the insulator 30 convexly protruded from the base member 10. The electrode wiring 40 serves to receive an electric signal from the transparent electrode 20 and transmit the signal to a controller 60.

The electrode wirings 40 according to the present invention are formed on the exposed surface of the insulator 30 having a curved surface convexly protruded, as shown in FIG. 2A, with the result that the plural electrode wirings are formed in a narrow width, and thus, the size of the bezel area B occupied by the electrode wirings can be decreased.

Specifically, respective one ends of the electrode wirings 40 are respectively connected to the transparent electrodes 20, and extended on the exposed surface of the insulator 30, which has the curved surface. Respective other ends of the electrode wiring 40 are formed to gather at one side of the base member 10. The region at which the electrode wirings 40 gather is referred to as a connection part. The connection part is connected to an FPC 50 to transmit a change in capacitance or a change in resistance value of the transparent electrode.

Here, the electrode wiring 40 is preferably made of silver (Ag). The silver (Ag) has high electrical conductivity, and excellent processability and mechanical properties. However, the material for the electrode wiring is not limited thereto, and the electrode wiring may be made of any material that can have conductivity. Here, the electrode wiring 40 is formed on the insulator 30 by using screen printing, gravure printing, inkjet printing, or the like.

The transparent electrode 20 is a portion where the change in capacitance (in case of a capacitive type) or the change in resistance value (in case of a resistive type) is sensed when the touch screen is touched by hand of the user. Electric change of the transparent electrode 20 caused by external touch is transmitted to the controller 60 through the electrode wiring 40.

Figure 3A:
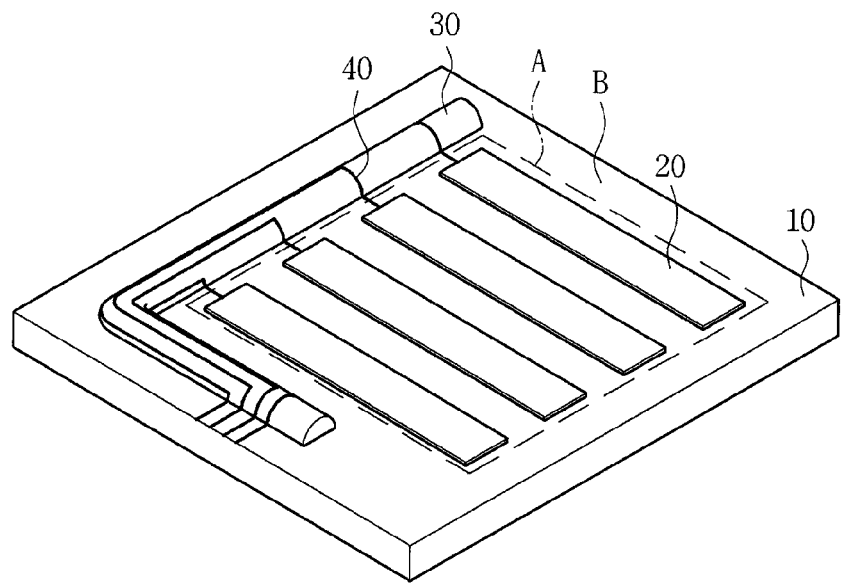
FIGS. 3A to 3D are perspective views of the touch panels according to the present invention, showing modification examples of the transparent electrode shown in FIG. 1.
Figure 3B:
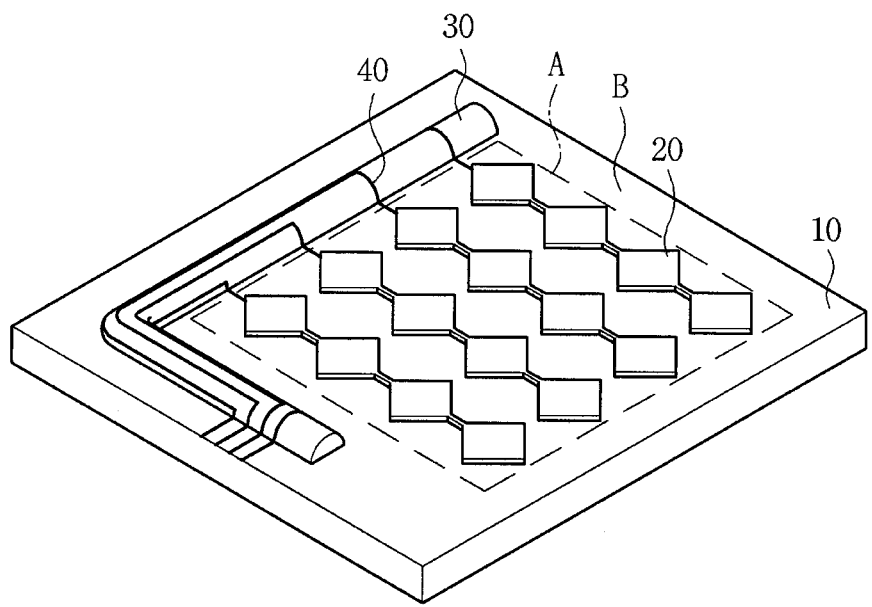
Figure 3C:
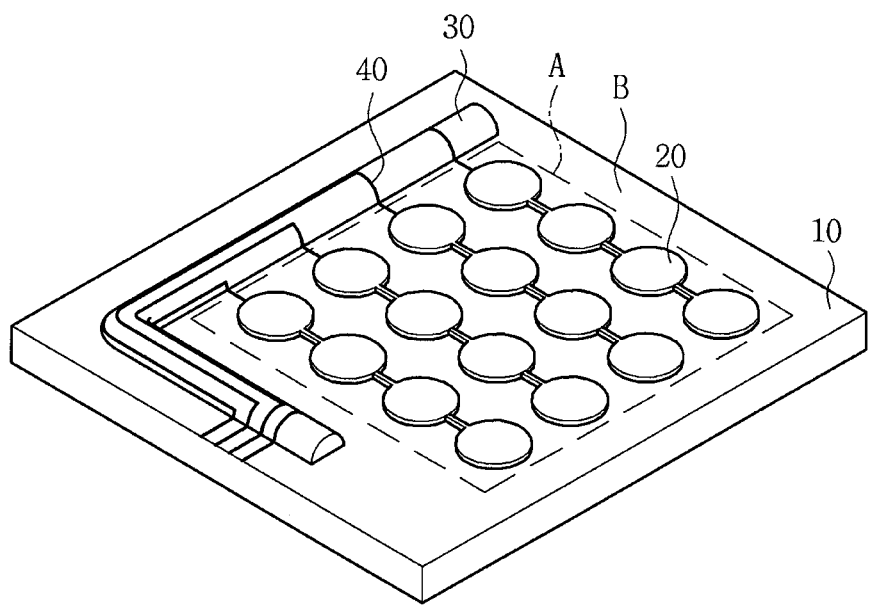
Figure 3D:
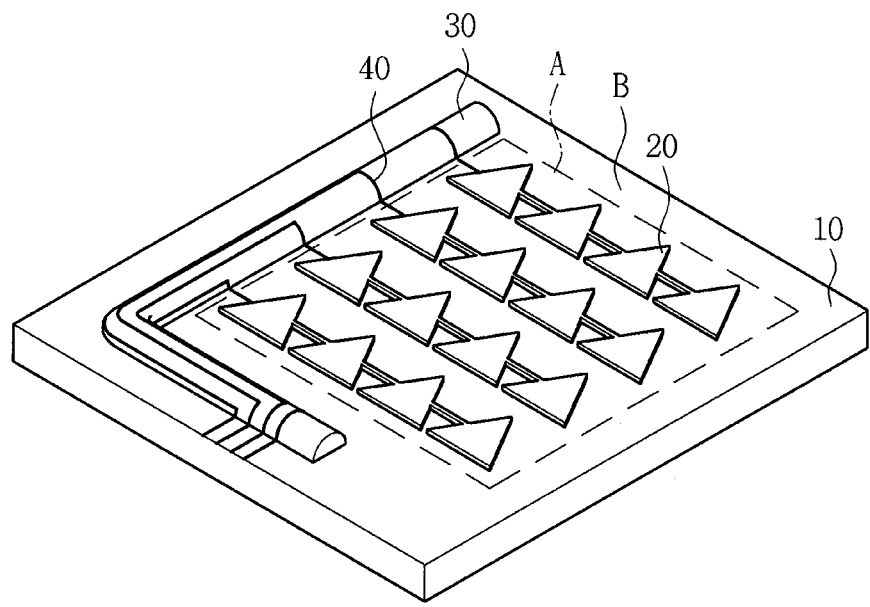

Here, as shown in FIG. 3A, the transparent electrode 20 may be preferably formed in plural number. The plural transparent electrodes 20 are formed to have the same shape, and then, enable the controller 60 to accurately recognize the point touched by the user. The shape of the transparent electrode 20 may be a bar shape (FIG. 3A), a diamond shape (FIG. 3B), a circle shape (FIG. 3C), or a triangle shape (FIG. 3D), and these shapes are provided by way of examples only, and not limited thereto.

The transparent electrode 20 is made of a transparent conductive material. As a constituent material for the transparent electrode 20, transparent conductive oxide (TCO), such as, indium tin oxide (ITO), antimony tin oxide (ATO), or the like, is generally employed.

Here, the transparent electrode 20 may be preferably made of a conductive polymer. The conductive polymer has excellent flexibility, and a coating process thereof is simple. As the conductive polymer, organic based compounds, such as, polythiophenes, polypyrroles, polyanyilines, polyacetylenes, polyphenylenes, and the like, may be employed.

The conductive polymer may be more preferably poly-3, 4-ethylenedioxythiophene/polystyrenesulfonate (PEDOT/PSS). PEDOT/PSS has high transparency and excellent electric conductivity. However, the conductive polymer is not limited thereto, and may be used by mixing with at least one kind of organic based compound having conductivity.

Meanwhile, the transparent electrode 20 may be formed on the base member 10 by using a dry process, such as, sputtering, evaporation or the like, a wet process, such as, dip coating, spin coating, roll coating, spray coating, or the like, or a direct patterning process, such as, screen printing, gravure printing, inkjet printing, or the like.

The base member 10 is made of a material having a support force by which the transparent electrodes 20 and the electrode wirings 40 can be supported, and transparency by which an image supplied from an image display device can be recognized by the user. The base member 10 may be formed of polyethyleneterephthalate (PET), polycarbonate (PC), polymethylmethacrylate (PMMA), polyethylenenaphthalate (PEN), polyethersulfone (PES), cyclic olefin copolymer (COC), triacetylcellulose (TAC) film, polyvinyl alcohol (PVA) film, polyimide (PI) film, polystyrene (PS), biaxially oriented polystyrene (BOPS; containing K resin), glass, tempered glass, or the like, but is not particularly limited thereto.

A touch panel according to a second preferred embodiment of the present invention includes a base member including a groove portion of which an exposed surface has a concave curved surface, transparent electrodes formed in an active area of the base member, and electrode wirings formed on the exposed surface of the groove portion and connected to respective one ends or respective both ends of the transparent electrodes. In the present invention, the electrode wirings are formed on the exposes surface of the groove portion, which is formed to have a concave curved surface, and thus, plural electrode wirings can be formed in a narrow width, thereby decreasing the size of the bezel area. Hereinafter, the touch panel will be described in detail with reference to FIGS. 4 to 5B. However, a description for portions overlapping the above-described portions will be omitted or simply stated.

Figure 4:
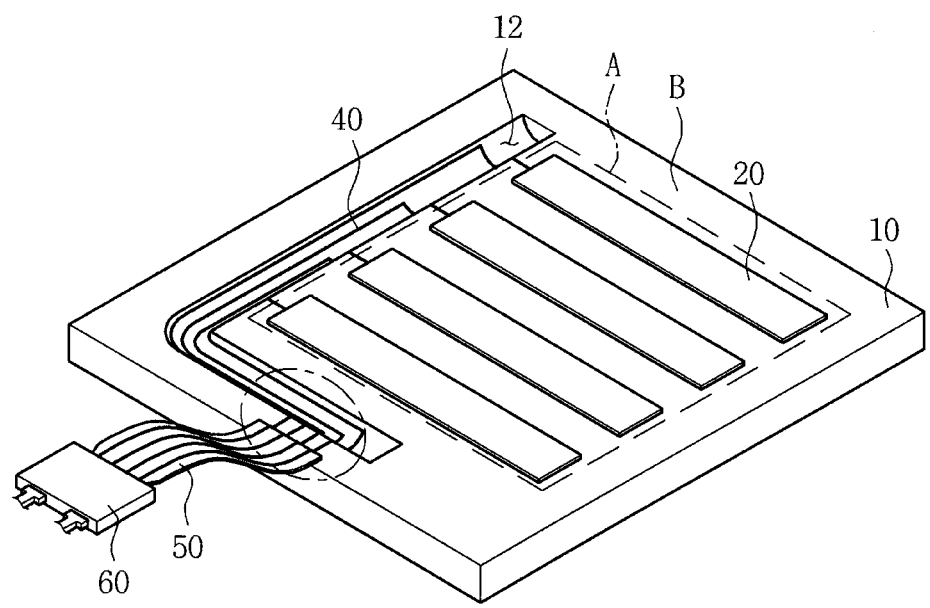
FIG. 4 is a perspective view of a touch panel according to a second preferred embodiment of the present invention.

As shown in FIG. 4, in the present invention, a groove portion 12, of which an exposed surface has a concave curved surface, is formed in a bezel area (B). Specifically, the groove portion 12 is extended from a lateral surface of the transparent electrode 20 to one side of the base member 10. Here, one side of the base member 10 is referred to as an area indicated by a dot-and-dash line in FIG. 4. The exposed surface of the groove portion 12 formed in the bezel area B has the curved surface, and thus, the surface area thereof is increased by 57% or more, as compared when the exposed surface has a flat surface. Therefore, more electrode wirings 40 can be formed on the exposed surface of which the surface area is increased, based on the same width of the base member 10, thereby decreasing the size of the bezel area.

Figure 5A:
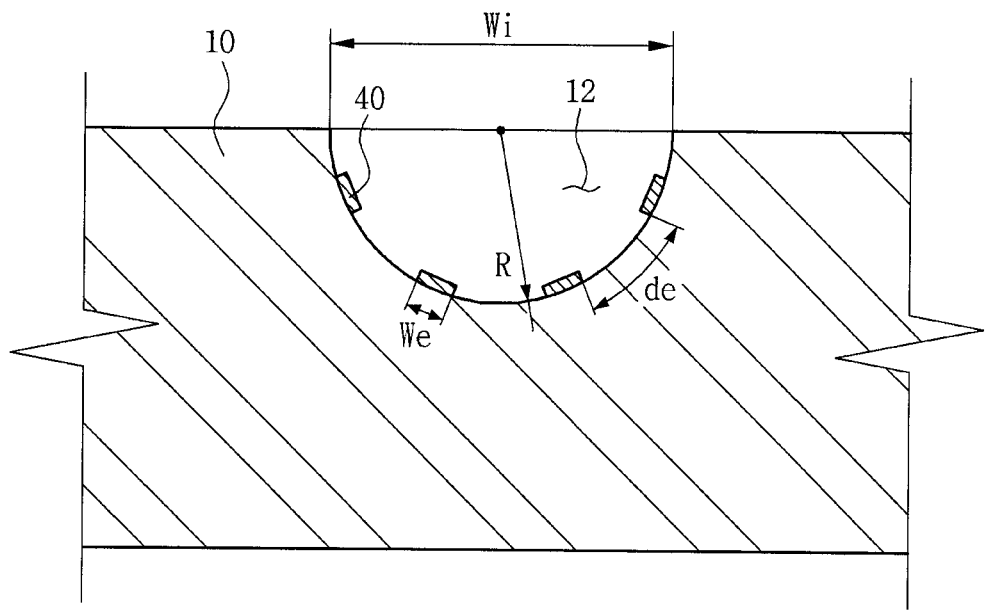
FIGS. 5A and 5B are cross-sectional views showing the groove portion and the electrode wirings shown in FIG. 4.
Figure 5B:
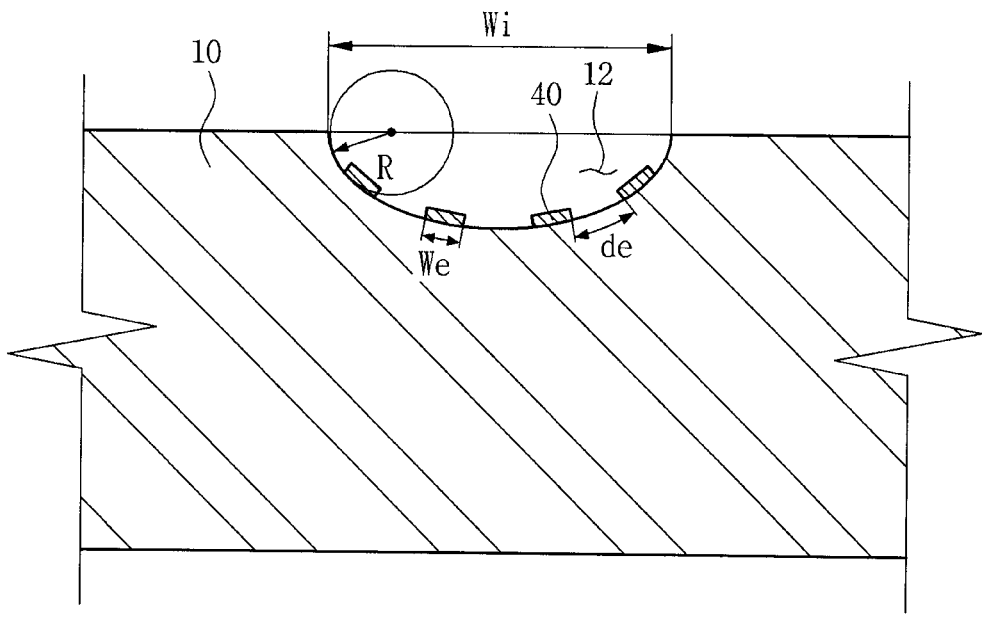

Here, as shown in FIGS. 5A and 5B, a cross-section of the groove portion 12 has a predetermined curvature. As described above, the curvature means the reciprocal of a radius curvature (R) of a circle bordering a cross-section of the groove portion 12. As the cross-section of the groove portion 12 has a curvature, the exposed surface of the groove portion 12 has a concave curved surface shape. The cross-section of the groove portion 12 may have a semi-circle shape (FIG. 5A) or a semi-ellipse shape (FIG. 5B). In addition, when the cross-section of the groove portion 12 has the semi-circle shape, the exposed surface of the groove portion 12 has an area, which is about 1.7 times larger than an area of a flat surface, based on the same width of the base member 10. However, the cross-section of the groove portion 12 is not limited thereto, and for example, may include any shape that can have a curvature.

In addition, a width (Wi) of the groove portion 12 is smaller than the sum of widths (We) of the plural electrode wirings 40 and lengths of distances between electrode wirings (de). Therefore, the plural electrode wirings 40 are formed on the groove potion 12 having a width narrower than a width occupied by forming the same number of electrode wirings 40 on the flat surface of the base member 10, and thus, the area of the bezel area B can be decreased.

Meanwhile, there are a physical method and a chemical method in forming the groove portion 12 on the base member 10. In the case where the groove portion 12 is formed by the physical method, the groove portion 12 is preferably formed by laser. In the case where etching is performed by the laser, CO2 laser, YAG laser, Excimer laser, fiber laser, or the like may be used as the laser. hi cases of the chemical method, the groove portion 12 may be formed by performing exposing, developing, and etching processes, using photoresist.

The electrode wirings 40 are formed on the exposed surface of the groove portion 12, as shown in FIG. 5A. Specifically, respective one ends of the electrode wirings 40 are respectively connected to the transparent electrodes 20, and extended on the exposed surface of the groove portion 12, which has the concave curved surface. In addition, the respective other ends of the electrode wiring 40 are formed to gather at one side of the base member 10. As described above, the electrode wiring 40 may be formed on the exposed surface of the groove portion 12 by using screen printing, gravure printing, inkjet printing, or the like.

According to the present invention, the insulator is formed to be convexly protruded from the base member, and thus, the exposed surface of the insulator has a curved surface, with the result that a surface area of the insulator is larger than a flat surface. Therefore, when the electrode wirings are formed on the exposed surface of the insulator, plural electrode wirings can be formed in a narrow width, and thus, the size of the bezel area can be decreased.

In addition, according to the present invention, the insulator has a width, which is smaller than the sum of the widths of the plural electrode wirings and the lengths of distances between the electrode wirings, and thus, the electrode wirings can be formed in a narrow region, as compared with when the electrode wirings are formed on the flat surface of the base member.

In addition, according to the present invention, the electrode wirings are formed in the groove portion with a concaved curved surface, which is formed on the base member, and thus, the plural electrode wirings can be formed in a narrow width, thereby decreasing the size of the bezel area.

Although the embodiment of the present invention has been disclosed for illustrative purposes, it will be appreciated that a touch panel according to the invention is not limited thereto, and those skilled in the art will appreciate that various modifications, additions and substitutions are possible, without departing from the scope and spirit of the invention.

Accordingly, any and all modifications, variations or equivalent arrangements should be considered to be within the scope of the invention, and the detailed scope of the invention will be disclosed by the accompanying claims.

What is claimed is:

1. A touch panel, comprising:
   a base member divided into an active area positioned at the center thereof, and a bezel area positioned at the edge thereof while surrounding the active area;
   a transparent electrode formed in the active area;
   an insulator formed in the bezel area, and convexly protruded from the base member such that an exposed surface thereof has a curved surface; and
   an electrode wiring formed on the exposed surface of the insulator and connected to one end or both ends of the transparent electrode.

2. The touch panel as set forth in claim 1, wherein the insulator has a cross-section with a predetermined curvature.

3. The touch panel as set forth in claim 1, wherein the insulator has a cross-section of semi-circle shape or semi-ellipse shape.

4. The touch panel as set forth in claim 1, wherein the transparent electrode is patterned in a bar shape, a diamond shape, a circle shape, or a triangle shape.

5. The touch panel as set forth in claim 1, wherein the transparent electrode is patterned and formed in plural number, and the number of electrode wirings is plural so that the plural electrode wirings are connected to the plural transparent electrodes, respectively.

6. The touch panel as set forth in claim 5, wherein the insulator has a width, which is smaller than the sum of widths of the plural electrode wirings and lengths of distances between the electrode wirings.

7. The touch panel as set forth in claim 1, wherein the insulator is formed of any one of a phenol resin, an epoxy resin, and an imide resin.

8. The touch panel as set forth in claim 1, wherein the transparent electrode is formed of a conductive polymer.

9. The touch panel as set forth in claim 8, wherein the conductive polymer includes poly-3,4-ethylenedioxythiophene polystyrenesulfonate (PEDOT/PSS), polyaniline, polyacetylene or polyphenylenevinylene.

10. A touch panel, comprising:
    a base member divided into an active area positioned at the center thereof, and a bezel area positioned at the edge thereof while surrounding the active area, and including a groove portion being formed in the bezel area such that an exposed surface thereof has a concave curved surface;
    a transparent electrode formed in the active area; and
    an electrode wire connected to one end or both ends of the transparent electrode and formed on the exposed surface of the groove portion.

11. The touch panel as set forth in claim 10, wherein the groove portion has a cross-section with a predetermined curvature.

12. The touch panel as set forth in claim 10, wherein the groove portion has a cross-section of semi-circle shape or semi-ellipse shape.

13. The touch panel as set forth in claim 10, wherein the transparent electrode is patterned and formed in plural number, and the number of electrode wirings is plural so that the plural electrode wirings are connected to the plural transparent electrodes, respectively.

14. The touch panel as set forth in claim 13, wherein the groove portion has a width, which is smaller than the sum of widths of the plural electrode wirings and lengths of distances between the electrode wirings.

15. The touch panel as set forth in claim 10, wherein the transparent electrode is formed of a conductive polymer.

16. The touch panel as set forth in claim 15, wherein the conductive polymer includes poly-3,4-ethylenedioxythiophene polystyrenesulfonate (PEDOT/PSS), polyaniline, polyacetylene or polyphenylenevinylene.

\* \* \* \* \*